United States Patent
Aslot et al.

(10) Patent No.: US 9,747,031 B2
(45) Date of Patent: *Aug. 29, 2017

(54) ZERO COPY SUPPORT BY THE VIRTUAL MEMORY MANAGER

(71) Applicant: International Business Machines Corporation, Armonk, NY (US)

(72) Inventors: Vishal C. Aslot, Austin, TX (US); Ninad S. Palsule, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/345,579

(22) Filed: Nov. 8, 2016

(65) Prior Publication Data

US 2017/0139601 A1    May 18, 2017

Related U.S. Application Data

(63) Continuation of application No. 15/044,179, filed on Feb. 16, 2016, now Pat. No. 9,563,361, which is a (Continued)

(51) Int. Cl.
G06F 12/10    (2016.01)
G06F 13/00    (2006.01)
(Continued)

(52) U.S. Cl.
CPC ............ G06F 3/0604 (2013.01); G06F 3/064 (2013.01); G06F 3/065 (2013.01); G06F 3/0613 (2013.01);
(Continued)

(58) Field of Classification Search
CPC ............ G06F 12/10; G06F 2212/1016; G06F 2212/152; G06F 2212/657; G06F 3/0605;
(Continued)

(56) References Cited

U.S. PATENT DOCUMENTS 7,454,477 B2    11/2008    Talluri et al.
7,917,539 B1    3/2011    Srinivasan et al.
(Continued)

OTHER PUBLICATIONS

Allen et al. "Zero-copy Queues for Native Signal Processing Using the Virtual Memory System," Fortieth Asilornar Conference on Signals, Systems and Computers (ACSSC'06), Oct. 29-Nov. 1 2006, p. 1188-1191, IEEE.
(Continued)

*Primary Examiner* — Yong Choe
(74) *Attorney, Agent, or Firm* — Teddi E. Maranzano (57) ABSTRACT

A computer system for copying a source file to a destination file using a virtual memory manager of a computer operating system is provided. One or more processors, one or more non-tangible computer-readable storage devices, and a plurality of program instructions are included. The program instructions provide for receiving, by the virtual memory manager, a request to copy the source file to a destination file. The program instructions further provides that based on the status of the virtual page, performing at least one moving the virtual page to the destination file, copying the virtual page to the destination file, reading the virtual page into memory, and ignoring the virtual page.

1 Claim, 4 Drawing Sheets

Related U.S. Application Data continuation of application No. 14/939,491, filed on Nov. 12, 2015.

(51) Int. Cl.
*G06F 3/06* (2006.01)
*G06F 12/02* (2006.01)

(52) U.S. Cl.
CPC .......... *G06F 3/0643* (2013.01); *G06F 3/0665* (2013.01); *G06F 3/0673* (2013.01); *G06F 12/023* (2013.01); *G06F 12/10* (2013.01); *G06F 2212/1016* (2013.01); *G06F 2212/152* (2013.01); *G06F 2212/154* (2013.01); *G06F 2212/263* (2013.01); *G06F 2212/657* (2013.01)

(58) Field of Classification Search
CPC ........ G06F 3/061; G06F 3/064; G06F 3/0647; G06F 3/0665; G06F 3/0673
See application file for complete search history.

(56) References Cited

U.S. PATENT DOCUMENTS

| | | |
|---|---|---|
| 7,996,569 B2 | 8/2011 | Aloni et al. |
| 8,601,496 B2 | 12/2013 | Aloni et al. |
| 8,645,634 B1 | 2/2014 | Cox et al. |
| 8,713,180 B2 | 4/2014 | Bakke et al. |
| 2007/0011358 A1 | 1/2007 | Wiegert et al. |
| 2013/0208548 A1 | 8/2013 | Hung |
| 2013/0339572 A1 | 12/2013 | Fanning et al. |
| 2014/0075007 A1 | 3/2014 | Kumar et al. |
| 2014/0195739 A1 | 7/2014 | Yu et al. |
| 2014/0229946 A1 | 8/2014 | van Riel |
| 2014/0281115 A1 | 9/2014 | Biswal et al. |
| 2016/0026489 A1 | 1/2016 | Maislos et al. |

OTHER PUBLICATIONS

Kubiatowicz, "SOR & LRVM," EECS 262a Advanced Topics in Computer Systems, Sep. 24, 2014, p. 1-35, Lecture 7, Electrical Engineering and Computer Sciences, University of California, Berkeley.

Satyanarayanan et al., "Lightweight Recoverable Virtual Memory," SIGOPS '93, Dec. 1993, p. 146-160, ACM, North Carolina, USA.

Sears et al., "Segment-Based Recovery: Write-ahead logging revisited," VLDB '09, Aug. 24-28, 2009, 12 Pages, VLDB Endowment, ACM, Lyon, France.

Tezuka et al., "Pin-down Cache: A Virtual Memory Management Technique for Zero-copy Communication," Proceedings of the First Merged International Parallel Processing Symposium and Symposium on Parallel and Distributed Processing, 1998, p. 308-314, IEEE.

IBM: List of IBM Patents or Patent Applications Treated as Related (Appendix P), Jan. 4, 2017, 2 pages.

Pending U.S. Appl. No. 14/939,491, filed Nov. 12, 2015, entitled: "Zero Copy Support by the Virtual Memory Manager", 24 pages.

Pending U.S. Appl. No. 15/044,179, filed Feb. 16, 2016, entitled: "Zero Copy Support by the Virtual Memory Manager", 20 pages.

Pending U.S. Appl. No. 15/345,564, filed Nov. 8, 2016, entitled: "Zero Copy Support by the Virtual Memory Manager", 20 pages.

ZERO COPY SUPPORT BY THE VIRTUAL MEMORY MANAGER

BACKGROUND

The present invention relates generally to the field of computer virtual memory, and more particularly to a zero copy file transfer implementation using the virtual memory manager (VMM) of an operating system.

Copying a file from a source to a destination is a common user operation. For example, a web-based application may serve significant amounts of data such as music, video, and other data files. Even though much of the data may be static, meaning that it remains unchanged, data transfers between user address spaces cause context switches which can negatively impact overall performance, since each time a block of data crosses a user-kernel boundary it is copied to another buffer. The data transfers consume CPU cycles and memory bandwidth. Most UNIX operating systems provide a zero copy implementation which minimizes or avoids the context switches caused by multiple user spaces issuing multiple read/write calls to perform the file copy.

In one example of a zero copy implementation, memory for the copying operation can be reduced by using the memory mapped file facility of a virtual memory manager (VMM) in conjunction with the operating system file management component. While memory mapping can be used to provide access to a file by more than one user (i.e., address space), there is only one copy of the file and additional mapping techniques are required to complete a copy operation.

In another example, a file may be shared through a dummy parent segment as a result of a fork( )system call, whereby the parent process creates a new user process (i.e., child process). The child process inherits the parent's process image (i.e., address space), but the read-only pages may be shared between the parent and child. Only the read-write pages are copied to the child. Additional operations are required to create a copy of the file.

In a further example, a file may be shared by transferring a reference to the shared memory containing the file. In this approach, the operating system structure that maps the file pages is changed to reference a new file, but the actual pages still belong to the original file.

However, there are still cases where memory usage and context switching is needed to complete the transfer of data from a source VMM page to a destination VMM page. An improved zero copy implementation using the VMM may further increase performance by reducing context switches and memory consumption, thereby freeing CPU cycles for other work.

SUMMARY

According to one embodiment, a processor-implemented method for copying a source file to a destination file using a virtual memory manager (VMM) of a computer operating system is provided. The method includes receiving, by the VMM, a request to copy the source file to the destination file. The method also provides that based on a status of the virtual page in the source file, at least one of the following is performed: moving the virtual page to the destination file, copying the virtual page to the destination file, reading the virtual page into memory, and ignoring the virtual page.

According to another embodiment, a computer program product for copying a source file to a destination file using a virtual memory manager of a computer is provided. The computer program product includes the virtual memory manager of a computer operating system embodied on a computer readable storage medium, and having program instructions executable by a processor. The program instructions receive, by the virtual memory manager, a request to copy the source file to the destination file. Based on the virtual page in the source file being clean, the program instructions move a reference to the virtual page from a source file control block to a destination file control block, and schedule the moved virtual page for flush to disk, and free the moved virtual page upon completion of the flush to disk. Based on the virtual page in the source file being in an allocated but empty portion of the source file, the program instructions ignore the virtual page in the source file. Based on the virtual page in the source file including uncommitted modifications, the program instructions allocate the real memory page associated with the destination file, copy the virtual page in the source file to the allocated real memory page, schedule the allocated real memory page for the flush to disk, and free the allocated real memory page upon completion of the flush to disk. Based on the virtual page in the source file not being in memory, the program instructions initiate a page fault, and perform at least one of: moving the virtual page to the destination file, copying the virtual page to the destination file, and ignoring the virtual page.

According to another embodiment, a computer system for copying a source file to a destination file using a virtual memory manager of a computer operating system is provided. The computer system includes one or more processors, one or more non-tangible computer-readable storage devices, and a plurality of program instructions stored on at least one of the one or more storage devices for execution by at least one of the one or more processors. The program instructions receive, by the virtual memory manager, a request to copy the source file to the destination file. Based on the virtual page in the source file being clean, the program instructions move a reference to the virtual page from a source file control block to a destination file control block, and schedule the moved virtual page for flush to disk, and free the moved virtual page upon completion of the flush to disk. Based on the virtual page in the source file being in an allocated but empty portion of the source file, program instructions ignore the virtual page in the source file. Based on the virtual page in the source file including uncommitted modifications, the program instructions allocate the real memory page associated with the destination file, copy the virtual page in the source file to the allocated real memory page, schedule the allocated real memory page for the flush to disk, and free the allocated real memory page upon completion of the flush to disk. Based on the virtual page in the source file not being in memory, the program instructions initiate a page fault, and perform at least one of: moving the virtual page to the destination file, copying the virtual page to the destination file, and ignoring the virtual page.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

Embodiments of the present invention relate generally to the field of computers, and more particularly to a zero copy file transfer implementation using the virtual memory manager (VMM) of an operating system.

The following described exemplary embodiments provide a system, method and program product to, among other things, support zero copy operations using the VMM. Therefore, the present embodiment has the capacity to improve the technical field of computer performance by reducing CPU utilization and increasing throughput, thereby freeing CPU cycles for other work. CPU utilization is reduced, in part, because the zero copy operation is performed using one system call, thereby avoiding the multiple context switches. Further, exploiting the existing VMM memory cache management and memory flushing mechanisms may enhance memory utilization compared to other file copy operations.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

Embodiments of the present invention relate generally to the field of computers, and more particularly to a zero copy file transfer implementation using the virtual memory manager (VMM) of an operating system.

The following described exemplary embodiments provide a system, method and program product to, among other things, support zero copy operations using the VMM. Therefore, the present embodiment has the capacity to improve the technical field of computer performance by reducing CPU utilization and increasing throughput, thereby freeing CPU cycles for other work. CPU utilization is reduced, in part, because the zero copy operation is performed using one system call, thereby avoiding the multiple context switches. Further, exploiting the existing VMM memory cache management and memory flushing mechanisms may enhance memory utilization compared to other file copy techniques.

Figure 1:
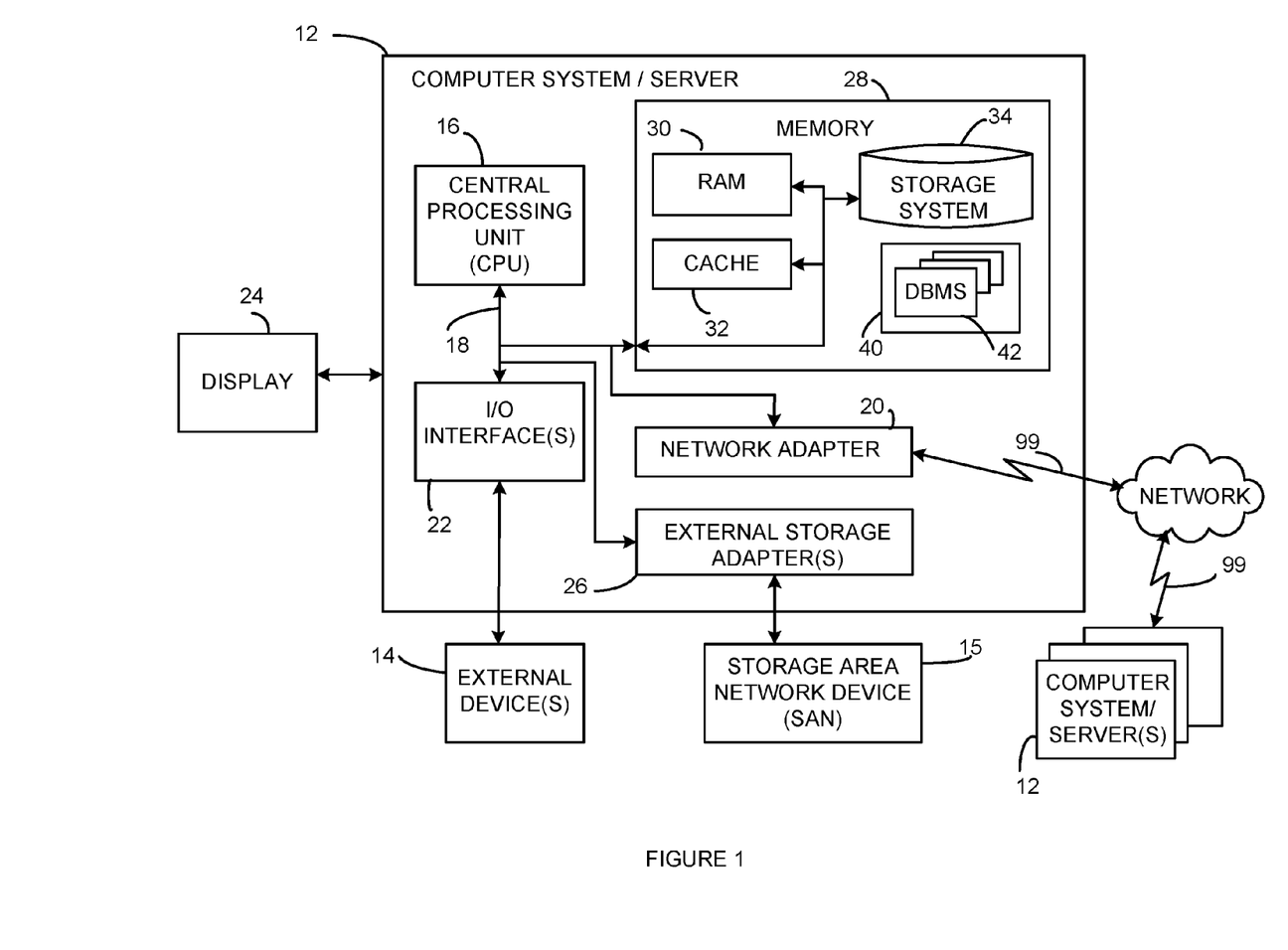
FIG. 1 illustrates an exemplary computer system environment operable for various embodiments of the disclosure.

FIG. 1 illustrates a block diagram of an exemplary computer system (i.e., server) 12 operable for various embodiments of the disclosure. As shown, the server 12 is only one example of a suitable computer for implementing zero copy operations using the VMM and is not intended to suggest any limitation as to the scope of use or functionality of embodiments of the disclosure described herein.

The server 12 is operational in numerous other computing system environments or configurations. For example, the server 12 may be a standalone machine, a virtual partition on physical host, a clustered server environment, or a distributed cloud computing environment that include any of the above systems or devices, and the like. When practiced in a distributed cloud computing environment, tasks may be performed by both local and remote servers 12 that are linked together and communicate through a communications network, such as the network 99.

The server 12 may be described in the context of executable instructions, such as a program, or more specifically, an operating system (OS) 40 that is an aggregate of program modules, components, objects, logic, or data structures, for example, being executed by the processing unit 16 to control the operation of the server 12. At least a portion of the OS 40, for example the VMM and the file management component, may be specialized to execute the algorithm of FIG. 2.

As shown in FIG. 1, the components of the server 12 may include, but are not limited to, one or more processors or processing units 16, a system memory 28, and a bus 18 that couples various system components, such as the system memory 28, to the processing unit 16.

System memory 28 can include computer system readable media in the form of volatile memory, such as random access memory (RAM) 30 and/or cache memory 32. The server 12 may further include other removable/non-removable, volatile/non-volatile computer system storage media.

By way of example only, a storage system 34 can be provided as one or more devices for reading from and writing to a non-removable, non-volatile magnetic media, such as a hard disk drive (HDD) or an optical disk drive such as a CD-ROM, DVD-ROM. Each device of the storage system 34 can be connected to bus 18 by one or more data media interfaces. The OS 40, and one or more application programs may be stored on the storage system 34 and subsequently loaded into memory 28 for execution, as needed.

The server 12 may also communicate with one or more external devices 14 such as a keyboard, a pointing device, a display 24, etc.; one or more devices that enable a user to interact with the server 12; and/or any devices (e.g., network card, modem, etc.) that enable the server 12 to communicate with one or more other computing devices. Such communication can occur via I/O interfaces 22. As will be discussed with reference to FIG. 5, server 12 may include internal components 800 and external components 900, respectively.

The server 12 can communicate with one or more networks such as a local area network (LAN), a general wide area network (WAN), and/or a public network (e.g., the Internet) via a network adapter 20. As depicted, the network adapter 20 communicates with the other components of the server 12 via bus 18.

External storage adapter 26 connects the server 12 with external storage subsystems, such as a storage area network (SAN) 15. Exemplary external storage adapters 26 include, but are not limited to, a host bus adapter (HBA), host channel adapter (HCA), SCSI, and iSCSI, depending upon the architectural implementation. The external storage adapter 26 communicates with the processing unit 16 and memory 28 of the server 12 over bus 18.

It should be understood that although not shown, other hardware and/or software components could be used in conjunction with the server 12. Examples include, but are not limited to: microcode, device drivers, redundant processing units, external disk drive arrays, RAID systems, tape drives, and data archival storage systems, etc.

Figure 2:
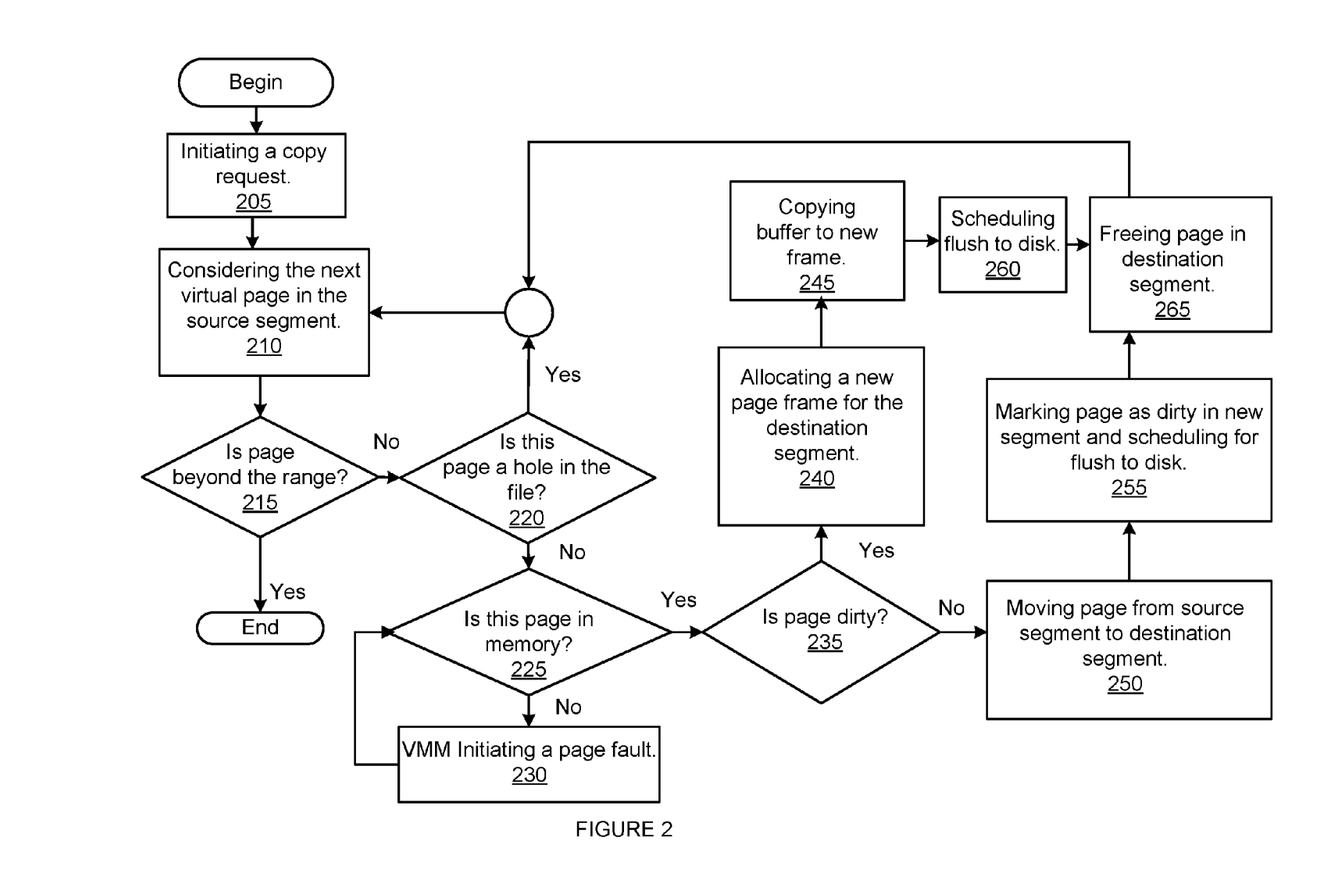
FIG. 2 illustrates an operational flow chart for implementing a zero copy operation in the virtual memory manager (VMM) of an operating system, according to various embodiments of the disclosure.

FIG. 2 illustrates a zero copy operation using the VMM of an operating system. The VMM of an operating system implements an interface to support copying pages from a source segment to a destination segment. In this context, a segment refers to a virtual memory segment that contains references to virtual pages of a fixed size. The number and sizes of the segments and virtual pages in an operating system is depending on the implementation of the particular computer architecture. The interface may be called by the operating system's file management component and may include an identifier associated with the destination segment. The interface may also be called by a user program having sufficient operating system to execute system-level functions. The caller may include parameters, such as flags, a logical offset within the file to begin the copying, and an amount of data to copy. The amount of data may be expressed in various ways, including a number of pages, a range of pages, and a number of bytes to copy during this call. The flags, and other parameters, such as the offset and the range values support a multi-threaded process, so that more than one thread may access different portions of the file simultaneously without conflict.

At 205 the calling thread of the process initiates a copy request. This embodiment assumes that a caller opens both the source and destination file and has mapped it into memory using one of several programming techniques available in the operating system of the implementation. A segment control block (SCB) maps one or more segments and is allocated upon opening and mapping the file in memory.

The caller may use the parameters to specify how the VMM should process a hole in the file, which typically is recognized in a sparse file. A sparse file is one that apparently has a size, such as 16 gigabytes (GB), but only contains a portion of its allocation in actual data, such as 1 GB. The remaining allocation being empty may be null or contain zeroes, or some similar filler, should the file be expanded to occupy its full allocation on disk. The operating system uses metadata, or other mechanisms, to indicate that only portions of the file contain actual data, the remainder being empty, thereby allowing the 16 GB file to physically occupy only 1 GB. At 210 the VMM considers the next virtual page in the source segment to evaluate whether the virtual page is beyond the range (step 215), if one was specified. The algorithm ends if the virtual page is beyond the specified range, or if the VMM in conjunction with the file management component recognizes that the end of the source file is reached.

If at 220, the virtual page is in a hole in the file, no action is taken, the page is ignored and processing continues at 210 to consider the next virtual page. Although a page that appears as a hole in a sparse file is part of the file's allocation, the page is empty and exists as a reference only. In this way, the destination file is also maintained as a sparse file and is not expanded as a result of the copy operation. If the virtual page is not a hole in the file, at 225 the VMM next checks whether the virtual page is in memory. A virtual page may be in memory if it was requested by a process and if the memory the virtual page occupies is not needed for another virtual page or process. The SCB, or a similar structure depending on the operating system implementation, tracks identifying information including the location, status and ownership of the virtual page. If the virtual page is not in memory, the VMM initiates a page fault (step 230) to indicate to the file management component to locate the page on disk and bring it into memory to make it accessible to the caller.

At 225, if the virtual page is in memory or when it is retrieved following resolution of the page fault (step 230), the VMM checks the status of the page. If, at 235, the page has been changed but the changes have not yet been written to disk (i.e., page is dirty), the VMM allocates a new page frame in the destination segment (step 240) and copies the buffer containing the virtual page to the new page frame (step 245). The virtual page is scheduled for flush to disk at 260. The memory used by the virtual page in the destination segment is freed (step 265) since the contents of the virtual page are is now written to disk as part of the destination file. Processing returns to 210 to consider the next virtual page, if any, in the source segment.

Returning to 235, if the page is not dirty, the virtual page is moved (i.e., not copied) from the source segment to the destination segment at 250. As discussed further with reference to FIG. 4, the reference to the virtual page is removed from the source file SCB and added to the destination file SCB. Moving the virtual page reference eliminates the need for an additional virtual memory page, as in a traditional copy operation. It is likely that a virtual page that is not dirty is not being referenced in the source file, and therefore its memory can be freed. If a process subsequently references that portion of the source file, the page fault process can retrieve it from the source file and allocation virtual memory for it. At page 255, the virtual page in the new destination segment is marked as dirty, which schedules the virtual page for flush to disk. At 265, the virtual page can be freed since it is on disk as part of the destination file. The algorithm returns to 210 to consider the next virtual page, if any, in the source segment.

The algorithm considers whether the virtual page is clean (i.e., unmodified) or dirty (i.e., contains uncommitted modifications) to ensure that the operating system file copy semantics are not violated. The algorithm coordinates access to resources (i.e., serializes), for example memory and file pages, in a multi-threaded environment, typically through the operating system's locking and enqueuing mechanisms. The choice of serialization mechanism may be operating system dependent. Thus, threads that change data, for example by modifying the source file in a copy process, are guaranteed exclusive access. The algorithm serializes one clean page at a time by locking the page to prevent the page from being changed prior to moving the virtual page, for example, by changing the segment pointing to the page from the source file to the destination file.

Figure 3:
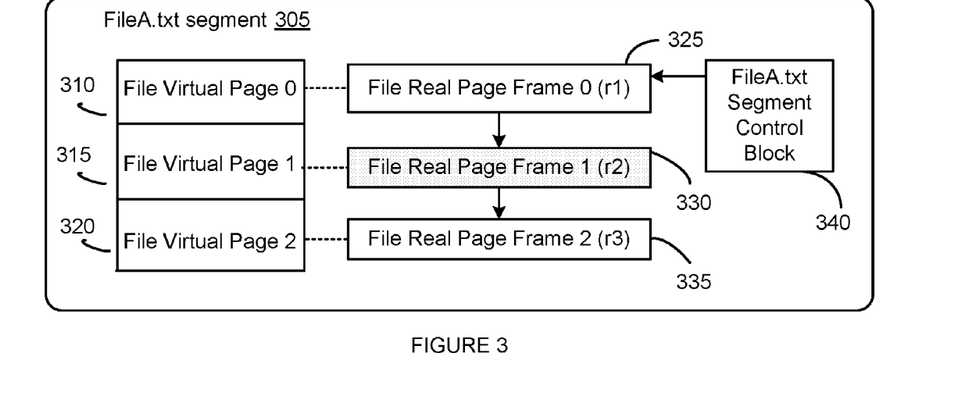
FIG. 3 is a block diagram of a source file prior to a copy operation, according to an embodiment of the disclosure.

FIG. 3 shows the source file, FileA.txt 305, after it is mapped into memory from disk and prior to the copy operation. The file has three "4" kilobyte (KB) virtual pages, 310, 315, and 320. The three virtual pages are backed, i.e., located in physical memory, at real page frames r1 325, r2 330, and r3 335. The SCB 340 of the VMM maintains the mapping and location of the frames and virtual pages. Page frames r1 325 and r3 335 are clean and are unmodified since being paged into memory, but page frame r2 330 has uncommitted modifications that were made since being paged into memory.

Figure 4:
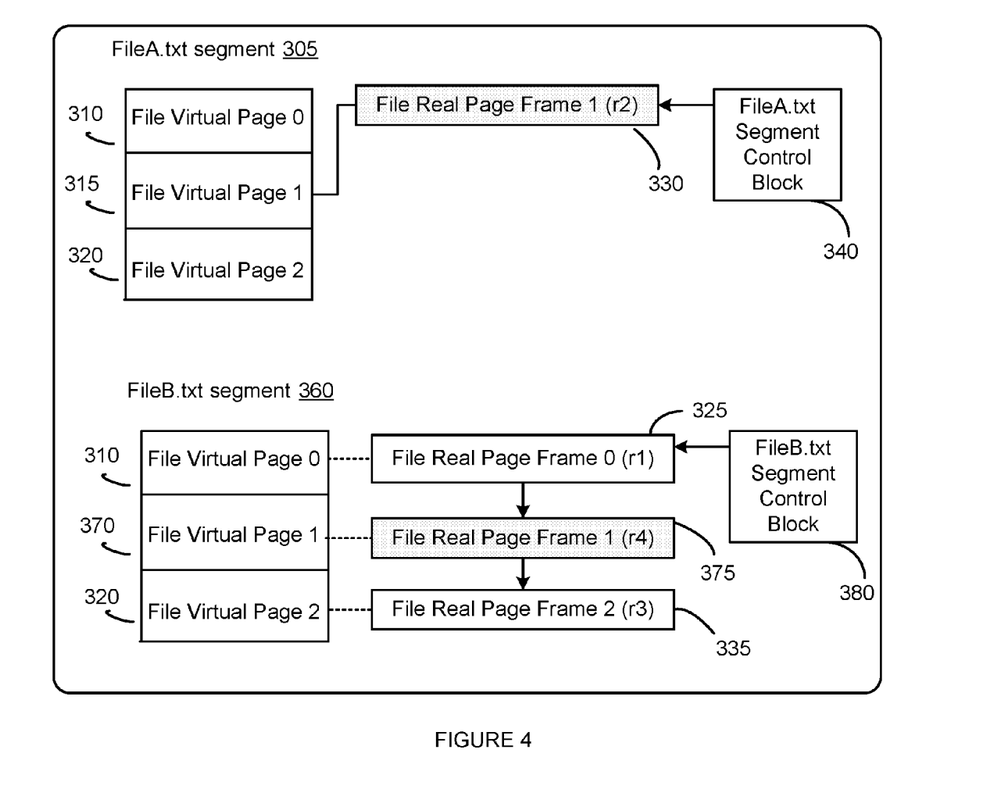
FIG. 4 is a block diagram of the files after the copy operation, according to an embodiment of the disclosure.

FIG. 4 shows the source file, FileA.txt 305 and the destination file, FileB.txt 360 following the copy operation. References to page frames r1 325 and r3 335 are moved from source FileA.txt SCB 340 to destination FileB.txt SCB 380. As described previously with reference to FIG. 2, the pages can be moved, rather than copied, from FileA.txt to FileB.txt because the pages are clean and not being referenced in source FileA.txt, but can easily be paged in if needed. As shown in FIG. 4, the algorithm eliminates the need for two additional pages of memory to hold the virtual pages and the associated context switches, as in a traditional copy operation. Page frame r2 330 in source FileA.txt 305 is dirty. Therefore, a new page frame r4 375 is allocated to destination FileB.txt SCB 380, and the page is copied to destination FileB.txt 380.

Figure 5:
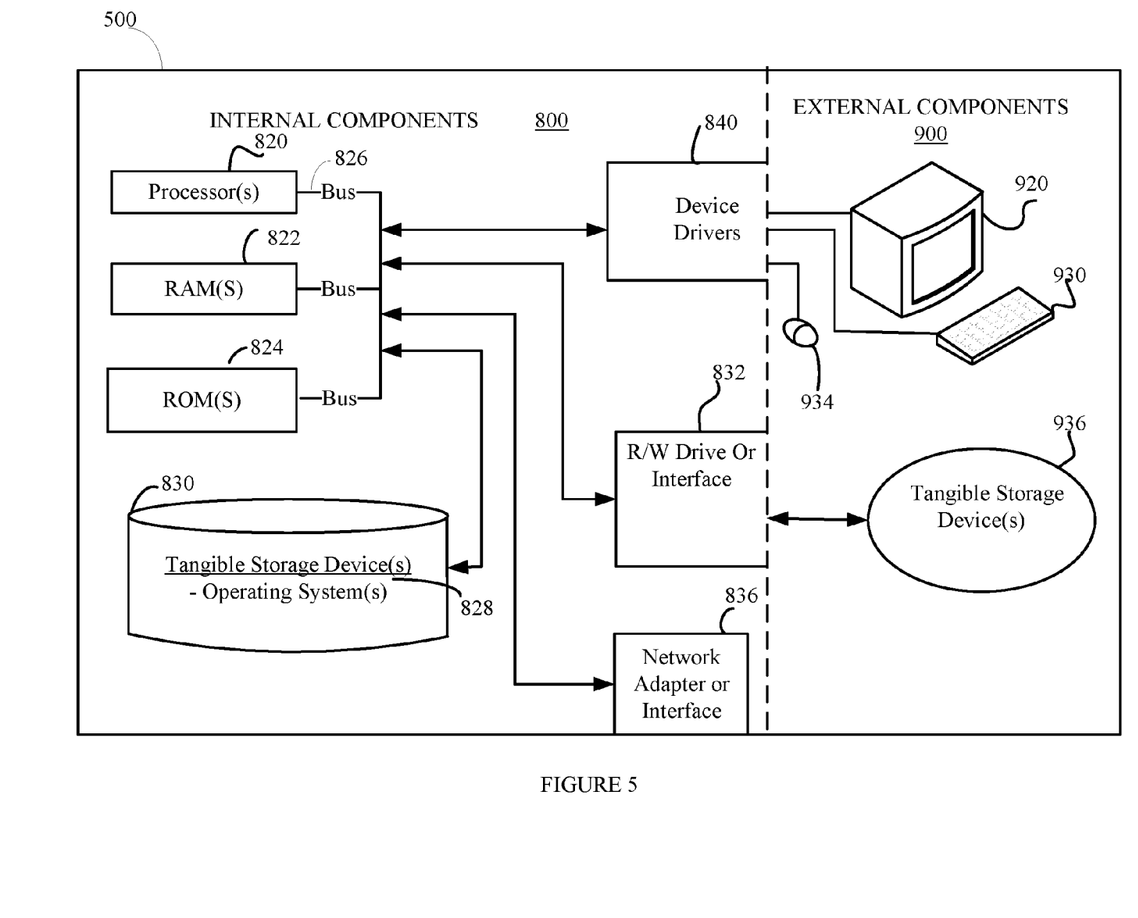
FIG. 5 is a block diagram of hardware and software of the computer environment according to an embodiment of the process of FIG. 2.

FIG. 5 illustrates an exemplary computing device 500 applicable for executing the algorithm of FIG. 2. Computing device 500 may include respective sets of internal components 800 and external components 900 that together may provide an environment for a software application. Each of the sets of internal components 800 includes one or more processors 820; one or more computer-readable RAMs 822; one or more computer-readable ROMs 824 on one or more buses 826; one or more operating systems 828 executing the method illustrated in FIG. 2; and one or more computer-readable tangible storage devices 830. The one or more operating systems 828 are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 500, can be downloaded to computing device 500 from an external computer (e.g., server) via a network (for example, the Internet, a local area network, or other wide area network) and respective network adapters or interfaces 836. From the network adapters (or switch port adapters) or interfaces 836 and operating system 828 associated with computing device 500 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A computer system for copying a source file to a destination file using a virtual memory manager of a computer operating system comprising:
   one or more processors, one or more computer-readable storage devices, and a plurality of program instructions stored on at least one of the one or more storage devices for execution by at least one of the one or more processors, the plurality of program instructions comprising:
   program instructions to receive, by the virtual memory manager, a request to copy the source file to the destination file;
   based on the virtual page in the source file being clean, program instructions to move a reference to the virtual page from a source file control block to a destination file control block, and to schedule the moved virtual page for flush to disk, and to free the moved virtual page upon completion of the flush to disk;
   based on the virtual page in the source file being in an allocated but empty portion of the source file, program instructions to ignore the virtual page in the source file;
   based on the virtual page in the source file including uncommitted modifications, program instructions to allocate the real memory page associated with the destination file, to copy the virtual page in the source file to the allocated real memory page, to schedule the allocated real memory page for the flush to disk, and to free the allocated real memory page upon completion of the flush to disk; and
   based on the virtual page in the source file not being in memory, program instructions to initiate a page fault, and to perform at least one of: move the virtual page to the destination file, copy the virtual page to the destination file, and ignore the virtual page.

\* \* \* \* \*